(12) United States Patent
Yarlagadda et al.

(10) Patent No.: US 8,107,495 B2
(45) Date of Patent: Jan. 31, 2012

(54) INTEGRATING ACCESS TO AUDIO MESSAGES AND INSTANT MESSAGING WITH VOIP

(75) Inventors: Madhu Yarlagadda, Los Altos, CA (US); Ashish Ashtekar, Sunnyvale, CA (US); Takchun Tse, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 885 days.

(21) Appl. No.: 11/129,668

(22) Filed: May 13, 2005

(65) Prior Publication Data
US 2006/0256816 A1    Nov. 16, 2006

(51) Int. Cl.
*H04J 3/16*    (2006.01)
(52) U.S. Cl. ........................................ 370/467; 709/206
(58) Field of Classification Search .................. 370/467, 370/481, 475, 338, 466, 401, 469; 709/204, 709/206; 707/3, 205; 379/265.01; 717/136; 715/229
See application file for complete search history.

(56) References Cited

U.S. PATENT DOCUMENTS

| | | | |
|---|---|---|---|
| 6,539,421 B1 | 3/2003 | Appelman et al. | |
| 6,567,419 B1 | 5/2003 | Yarlagadda | |
| 6,738,462 B1 | 5/2004 | Brunson | |
| 7,210,100 B2 * | 4/2007 | Berger et al. | 715/229 |
| 7,401,105 B2 * | 7/2008 | Carro | 707/205 |
| 2002/0144026 A1 | 10/2002 | Dunlap et al. | |
| 2003/0187936 A1 * | 10/2003 | Bodin et al. | 709/206 |
| 2003/0235287 A1 * | 12/2003 | Margolis | 379/265.01 |
| 2004/0032860 A1 | 2/2004 | Mundra et al. | |
| 2004/0160979 A1 | 8/2004 | Pepin et al. | |
| 2004/0170161 A1 * | 9/2004 | Laumen et al. | 370/352 |
| 2004/0199582 A1 | 10/2004 | Kucharewski et al. | |
| 2005/0094621 A1 * | 5/2005 | Acharya et al. | 370/352 |
| 2005/0117605 A1 * | 6/2005 | Yan et al. | 370/469 |
| 2005/0123118 A1 * | 6/2005 | Terry et al. | 379/211.02 |

(Continued)

FOREIGN PATENT DOCUMENTS

EP    1 161 038 A2    12/2001

(Continued)

OTHER PUBLICATIONS

Office Communication for U.S. Appl. No. 11/285,875, mailed on Aug. 14, 2008.

(Continued)

*Primary Examiner* — Aung S Moe
*Assistant Examiner* — Awet Haile
(74) *Attorney, Agent, or Firm* — Frommer Lawrence & Haug LLP; Jamie L. Wiegand (57) ABSTRACT

A system, method, and apparatus are directed towards providing integrated access to call information to an end-user using any of a variety of client applications, including an Instant Messaging (IM), a web-browser, and/or a VOIP client. An end-user may employ any of the above client applications to establish a communication session and enable an integrated access display for use in managing such call information as audio messages, call histories, and instant messaging conversations. The integrated access display may be managed through an intelligent integration client that may reside on a client device, such as a personal computer, a mobile device, a VOIP phone, and the like. Through the intelligent integration client, the end-user may search, retrieve, and/or view the call information. For example, using the VOIP phone, the end-user may search for and access a stored audio message, such as a voice mail message, or the like.

26 Claims, 7 Drawing Sheets

U.S. PATENT DOCUMENTS

| | | |
|---|---|---|
| 2005/0131888 A1 | 6/2005 | Tafoya et al. |
| 2005/0138002 A1* | 6/2005 | Giacobbe et al. ................. 707/3 |
| 2005/0198144 A1 | 9/2005 | Kraenzel et al. |
| 2005/0232284 A1* | 10/2005 | Karaoguz et al. ............. 370/401 |
| 2005/0238156 A1* | 10/2005 | Turner ..................... 379/202.01 |
| 2005/0249196 A1* | 11/2005 | Ansari et al. .................. 370/352 |
| 2007/0058681 A1* | 3/2007 | Bettis et al. .................. 370/493 |
| 2007/0115991 A1 | 5/2007 | Ramani et al. |
| 2008/0235669 A1* | 9/2008 | Carro ........................... 717/136 |

FOREIGN PATENT DOCUMENTS

| | | |
|---|---|---|
| WO | WO-01/78430 | 10/2001 |

OTHER PUBLICATIONS

Office Communication for U.S. Appl. No. 11/285,875, mailed on Feb. 26, 2009.

* cited by examiner

INTEGRATING ACCESS TO AUDIO MESSAGES AND INSTANT MESSAGING WITH VOIP

BACKGROUND OF THE INVENTION

The present invention relates generally to network communications, and more particularly, but not exclusively, to a system and method for seamlessly integrating access to instant message conversations, call histories, and audio messages across various clients.

Internet Protocol (IP) Telephony, also known as Voice over Internet Protocol (VOIP), is a technology that makes it possible to have a voice conversation over an IP network, such as the Internet, instead of a dedicated voice transmission line.

Depending on the service, one way to place a VOIP call is to pick up a phone and dial a number, using an adaptor that connects to an existing high-speed network connection. The call goes through a local telephone company to a VOIP provider. The phone call goes over the Internet to the called party's local telephone company for the completion of the call. Another way is to utilize a microphone headset plugged into a computer. The number is placed using the keyboard and may be routed through an IP network. Still another way is to employ specialized phones, sometimes called IP Phones, or VOIP phones, that may look like a normal phone. Such VOIP phones may connect to the network through an RJ-45 connector, or operate through a wireless connection.

Because VOIP make it possible to have voice conversations over IP networks, VOIP allows for a cost effective alternative to the traditional public switched telephone networks (PSTNs). Because of its relatively lower costs and ease of use, VOIP phone services have been rapidly increasing in popularity. With such an increase in popularity, there has been an increased desire to be able to integrate at least some of the VOIP features with a variety of other communication services. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a system, method, and apparatus for providing integrated access to call information using any of a variety of client applications, including an Instant Messaging (IM), a web-browser, and/or a VOIP client application. The end-user may employ any of the above client applications to establish a communication session. The end-user may further employ an intelligent integration client to manage an integrated access to the call information that may include audio messages such as voice mail messages, call histories, and instant messaging conversations. In one embodiment, the intelligent integration client resides on a client device such as a personal computer, a mobile device, a VOIP phone, and the like. The intelligent integration client may be configured to be readily accessible through the above client applications, using any of an icon, keystroke, menu, and the like. Through the intelligent integration client, the end-user may display, search, retrieve, and/or view the integrated call information. For example, in one embodiment, using the VOIP phone, the end-user may search for and access a stored audio message. The intelligent integration client may request the retrieval of the audio message and provide it to another client application within the client device so that the end-user may then listen to, reply to, and/or delete the audio message. In another embodiment, the end-user may employ an IM client to obtain integration access to call information. The end-user may then sort and/or search for an audio file for retrieval.

In one embodiment, the audio message is a voice mail message. In another embodiment, the audio message is a voice mail message that is integrated into Instant Messaging (IM). However, although the application is described using the term "voice mail" message, it should be understood that virtually any audio message may be used. Thus, the term "voice mail" should not be construed in a limiting sense, but rather merely as one example of a variety of possible audio messages that may be managed in an integrated approach by the present invention.

Illustrative Operating Environment

Figure 1:
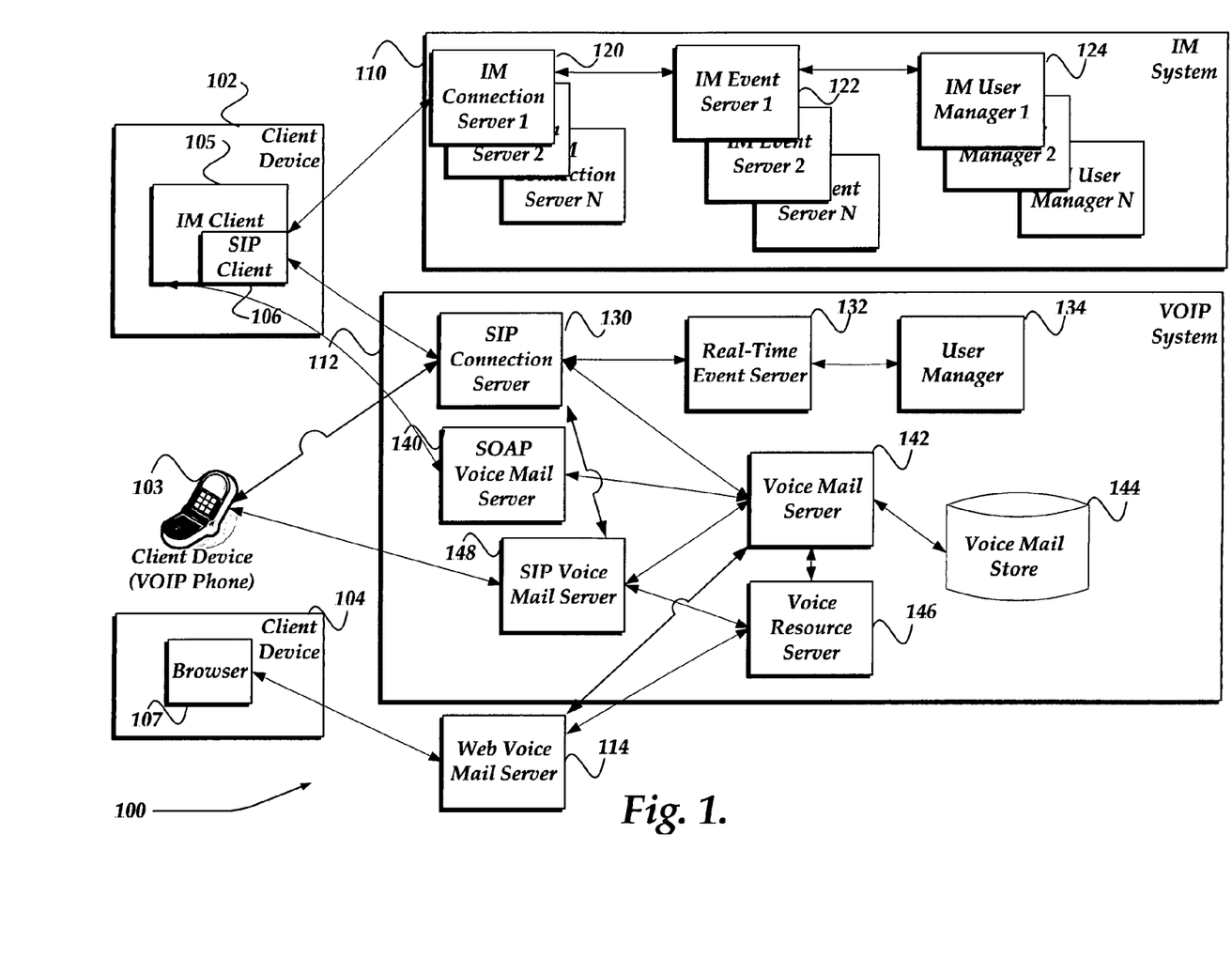
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention. System 100 of FIG. 1 represents one configuration that enables a variety of client applications and client devices to manage an integrated access to various call information. Such call information may include a variety of call files including audio messages such as voice mail, IM conversations, and call histories.

As shown in the figure, system 100 includes client devices 102-104, IM system 110, VOIP system 112, and Web Voice Mail (WVM) Server 114. IM system 110 may include IM connection servers 120, IM event servers 122, and IM user managers 124. VOIP system 112 includes SIP connection server 130, Real-Time event server 132, user manager 134, Simple Object Access Protocol (SOAP) voice mail server 140, SIP voice mail server 148, voice mail server 142, voice resource server 146, and voice mail store 144.

Client device 102 includes IM client 105 and SIP client 106. Client device 104 includes web browser 107. Client device 102 is in communication with IM connection servers 120 and SOAP voice mail server 140. Client device 103 is in communication with SIP connection server 130 and SIP voice mail server 148. Client device 104 is in communication with web voice mail server 114.

IM event servers 122 are in communication with IM connection servers 120 and IM user managers 124. Real-time event server 132 is in communication with SIP connection server 130 and user manager 134. Voice mail server 142 is in communication with voice mail store 144, voice resource server 146, web voice mail server 114, SIP voice mail server 148, SOAP voice mail server 140, and SIP connection server 130. SIP connection server 130 is also in communication with SIP voice mail server 148. Voice resource server 146 is further in communication with web voice mail server 114, and SIP voice mail server 148.

Client devices 102-104 may include virtually any computing device capable of receiving and sending a message over a network, to and from another computing device, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Although only illustrated in client device 104 (i.e., browser 107), each client device within client devices 102-104 may include a browser application, which is configured to receive and to send web pages, web-based messages, and the like. The browser application may be configured to receive and display graphics, text, multimedia, and the like, employing virtually any web based language, including, but not limited to Standard Generalized Markup Language (SMGL), such as Hyper-Text Markup Language (HTML), a wireless application protocol (WAP), a Handheld Device Markup Language (HDML), such as Wireless Markup Language (WML), WMLScript, JavaScript, and the like.

Client devices 102-104 may be further configured to receive a message from the another computing device, employing another mechanism, including, but not limited to email, Short Message Service (SMS), Multimedia Message Service (MMS), instant messaging (IM), internet relay chat (IRC), mIRC, Jabber, and the like. For example, client devices 102-104 may each include an IM client, substantially similar to IM client 105. IM clients, such as IM client 105 may also communicate with a SIP/Real-Time Transport Protocol (RTP) client, such as SIP client 106, to communicate to another computing device over SIP/RTP protocols.

Client devices 102-104 may further receive and send messages using any of a variety of VOIP protocols. For example, client devices 102-104 may be configured to employ RTP for communicating media data such as audio and video over a network (not shown). However, the invention is not so limited, and another media data mechanism may be employed, including IAX, and the like. Client devices 102-104 may also employ the SIP protocol for setting up a session between computing devices and enabling such actions as dialing a number, enabling a ring, a ringback tone, busy signal, and the like. However, the invention is not constrained to the SIP protocol, and other signaling protocols may be employed, including H.323, Skinny Client Control Protocol (SCCP), IAX, MiNET, and the like. Shown as an example, client device 102 includes SIP client 106, and client device 103 is configured to operate as a VOIP phone, employing the SIP/RTP protocols.

Client devices 102-104 may further include an intelligent integration client (IIC) (not shown). The IIC is described in more detail below in conjunction with FIGS. 2-3. Briefly, however, the IIC is configured to interact with a variety of client applications, including IM client 105, browser 107, and the like, to enable an end-user to manage call information, including searching for call information, selecting call information, and enabling access to the call information. In one embodiment, the call information includes a voice mail message that may be selected, retrieved, and heard.

Although not shown, clients 102-104 communicate with IM system 110, VOIP system 112, and web voice mail server 114 over various network infrastructures. Such networks are configured to couple one computing device to another computing device to enable them to communicate. The networks are enabled to employ any form of computer readable media for communicating information from one electronic device to another. Also, the networks may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the networks include any communication method by which information may travel between computing devices.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

IM system 110 is configured to manage IM sessions between client devices employing an IM client. IM system 110 may employ IM connection servers 120, IM event servers 122, and IM user managers 124 to manage one or more IM sessions. In one embodiment, IM connection servers 120, IM event servers 122, and IM user managers 124 may represent separate server processes operating with a single computing device. In another embodiment, IM connection servers 120, IM event servers 122, and IM user managers 124 may represent distinct processes operating across multiple computing devices. As such, IM system 110 may be implemented on a variety of computing devices including personal computers, desktop computers, multiprocessor systems, microprocessor-based devices, network PCs, servers, network appliances, and the like.

IM connection servers 120 are configured to receive a request to establish an IM session from an IM client, such as IM client 105. IM connection servers 120 may also receive from the IM client authentication information that may be employed to authenticate an end-user of the IM client. If the end-user is authenticated, IM connection servers 120 may enable the IM client to log into the IM session. IM connections servers 120 may also be configured to provide information about the established session to IM event servers 122.

IM connections servers 120 may also forward various request information from the IM client to IM event servers 122. Such request information may include, for example, a request to locate and communicate with another IM end-user.

IM event servers 122 are configured to receive the end-user's log in and other request information from IM connections servers 120. IM event servers 122 may request IM user managers 124 to store information about the IM client and end-user. IM user mangers 124 may employ a table, spreadsheet, file, database, and the like, to register the IM client, and on which IM connection server, within IM connection servers 120, the IM client is logged into. Thus, IM user managers 124 may store information about various IM conversations that may include such information as identifiers for end-users associated with an IM conversation, time information, account identifiers for the end-users, IM connection servers associated with an IM conversation, and so forth. As such, IM event servers 122 may also employ IM user managers 124 to determine which IM connection server, within IM connection servers 122, another end-user is logged into, and provide such information to IM connection servers 120, so that an IM session may be established between two or more IM end-users.

VOIP system 112 is configured to manage VOIP sessions between client devices using any of a variety of IP telephony protocols. VOIP system 112 is further configured to enable a variety of client devices and client applications to access voice mail messages.

As shown, VOIP system 112 may be implemented in a single computing device, with each of the illustrated components operating as one or more processes with the single computing device. VOIP system 112 may also be implemented across multiple computing devices, with one or more of the illustrated components distributed across the multiple computing devices. As such VOIP system 112 may be implemented on a variety of computing devices including personal computers, desktop computers, multiprocessor systems, microprocessor-based devices, network PCs, servers, network appliances, and the like.

SIP connection server 130 is configured to receive a request to establish a SIP connection, from a SIP client, such as SIP client 106, client device (VOIP phone) 103, and the like. The SIP client may provide identification information to SIP connection server 130 that may be used, at least in part, to authenticate the request to establish the SIP connection. If the SIP client is authenticated, SIP connection server 130 may enable the SIP client to log into a connection. SIP connection server 130 may also provide information about the SIP client to real-time event server 132. Real-time event server 132 may be configured to receive the information and provide it to user manager 134 for storage.

User manager 134 may store the information in a database, spreadsheet, table, file, and the like. Such information may include, for example, an identifier associated with the SIP client, an end-user associated with the SIP client, an address associated with SIP connection server 130, and the like. User manager 134 may receive and manage such information for a plurality of SIP clients. User manager 134 may also provide information to real-time event server 132 about at least one other SIP client, such that SIP connection server 130 may enable a SIP/RTP communication between one or more end-users.

Voice mail store 144 is configured to store and manage voice mail files (or virtually any other audio files) for at least one end-user. The voice mail files may be accessed using any of a variety of mechanism, including an identifier associated with an end-user, a computing device, and the like. As such voice mail store 144 may employ a database, folder, and the like to store the voice mail files. In addition, the voice mail files may be stored in virtually any format, including such compressed formats as G.711, G.721, G.722, G.723.1, G.729, Speex, and the like. However, the invention is not constrained to compressed formats, and as such, they may also be stored in virtually any uncompressed data format.

SOAP voice mail server 140, SIP voice mail server 148, and web voice mail server 114 are each configured to manage a request for voice mail from a client. For example, SOAP voice mail server 140 is configured to manage requests from a variety of clients, including web based clients, and IM clients, while SIP voice mail server 148 is configured to manage requests from VOIP (e.g., SIP/RTP) based clients. As such, each of SOAP voice mail server 140, SIP voice mail server 148, and web voice mail server 114 may employ a predefined protocol for communications with a predefined client type. Moreover, each of these voice mail servers may further communicate information about the predefined protocols being employed to voice mail server 142.

Voice mail server 142 is configured to receive a request for a voice mail file from any of SIP connection server 130, SOAP voice mail server 140, SIP voice mail server 148, web voice mail server 114, and the like, each of which may be configured to confirm that the request for the voice mail file is authentic and allowable.

If the request is permitted, voice mail server 142 may be configured to retrieve the voice mail file from voice mail file 144. Voice mail server 142 may determine whether the format of the retrieved voice mail file is compatible with requesting client device. If voice mail server 142 determines that the voice mail file is incompatible with the requesting client device, voice mail server 142 may employ voice resource server 146 to transcode the voice mail file to a compatible format. Voice resource server 146 may also be configured to forward the transcoded voice mail file to the requesting server, and/or voice mail server 142. Voice mail server 142 may be further configured to forward the transcoded voice mail file to the requesting server (SIP connection server 130, SOAP voice mail server 140, SIP voice mail server 148, and/or web voice mail server 114). The requesting server may also be configured to provide the transcoded voice mail file to the requesting client application (IM client 105, SIP client 106, browser 107, and the like).

In addition, voice mail server 142 may be arranged to provide to the requesting server a list of call histories associated with an end-user, requesting client device, and the like. In one embodiment, the call histories are configured to include call history information such as missed calls, received calls, placed calls, messages received, and the like. Such call history information may be displayed and managed at the requesting client device using the intelligent integration client. In one embodiment, the call histories are stored with voice mail server 142. In another embodiment, the call histories are stored in voice mail store 144. However, call history information may also be stored on each client device, without departing from the scope or spirit of the present invention. Voice mail server 142 may employ a process such as described below in conjunction with FIG. 5 to perform at least some of its actions.

Illustrative Client Device

Figure 2:
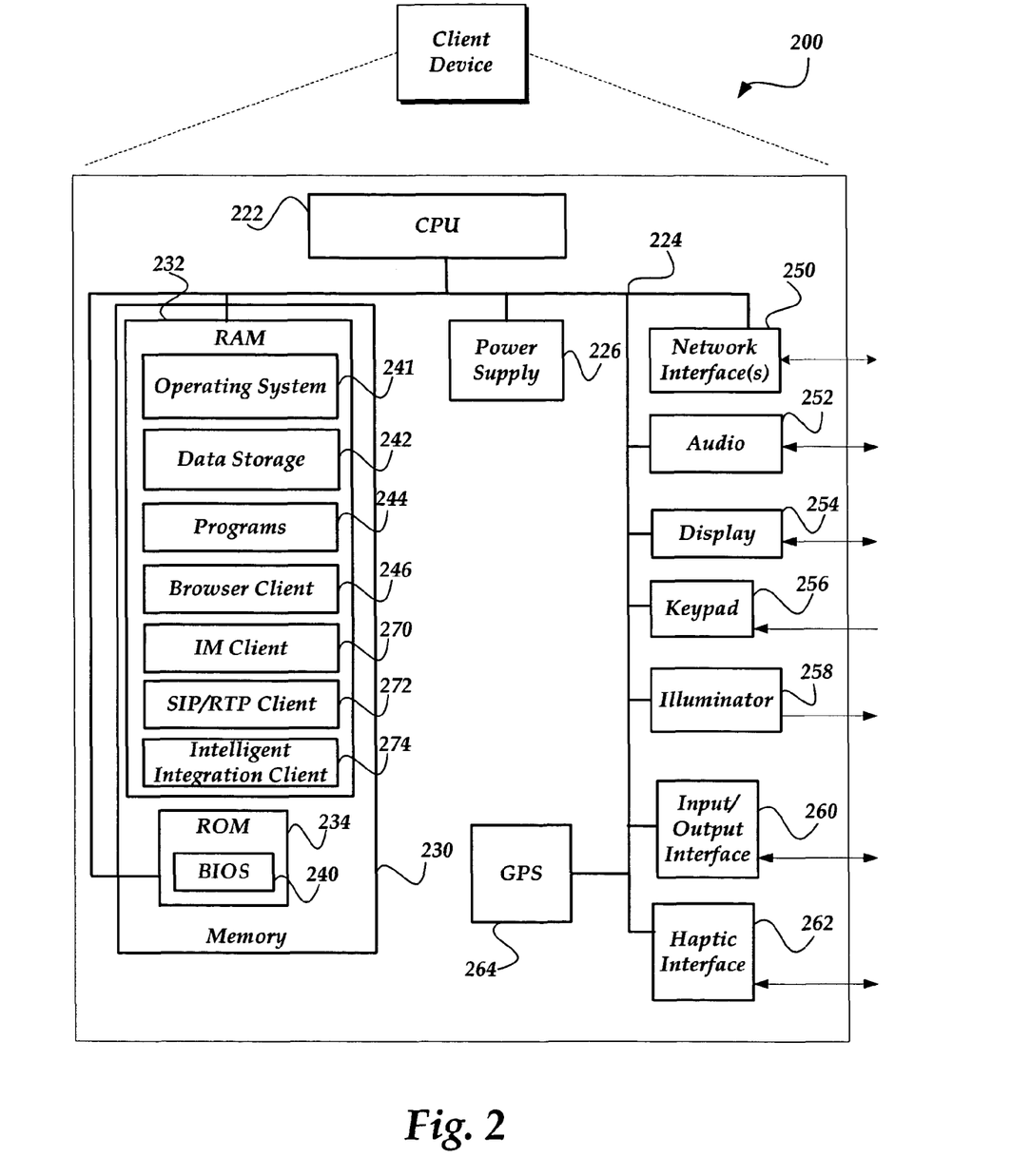
FIG. 2 shows one embodiment of a client device that may be included in a system implementing the invention.

FIG. 2 shows one embodiment of client device 200 that may be included in a system implementing the invention. In one embodiment, client device 200 is an IP telephone that is arranged to send and receive voice communications and messages such as VOIP messages via one or more wired and/or wireless communication interfaces. Generally, client device 200 may comprise any personally electronic device. Oftentimes, electronic devices will be capable of personal communication by connecting to one or more wired and/or wireless networks, connecting to multiple nodes of a single wired and/or wireless network, communicating over one or more channels to one or more networks, or otherwise engaging in one or more communication sessions. Such devices include IP telephones, smart phones, IP pagers, integrated devices combining one or more of the preceding devices, and the like. Client device 200 may also comprise other electronic devices that such as Personal Digital Assistants (PDAs), handheld computers, personal computers, multiprocessor systems, microprocessor-based or programmable consumer electronics, network PCs, wearable computers, and the like.

Client device 200 may include many more or less components than those shown in FIG. 2. For example, some embodiments of a VOIP phone may not be enabled for web access, or the like. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Client device 200 may provide an identifier, sometimes known as an originating line identifier (OLI) during a communication. The identifier may employ any of a variety of mechanisms, including a device model number, a carrier identifier, a mobile identification number (MIN), and the like. The MIN is often a telephone number, a Mobile Subscriber Integrated Services Digital Network (MS-ISDN), an electronic serial number (ESN), or other device identifier. The OLI may also include an IP address associated with client device 200. In one embodiment, the identifier is provided with each communication. In another embodiment, the identifier is provided when an end-user dials a phone number or other Called Line Identifier (CLI).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like. Data storage 242 may also be configured to store data associated with call information. Such call information may include call histories made by and/or to client device 200. For example, the call information may include a list of missed calls, received calls, placed calls, and the like.

Programs 244 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, and so forth. In addition, mass memory 230 stores browser client 246, IM client 270, SIP/RTP client 272, and Intelligent Integration Client (IIC) 274.

Browser client 246 may include computer executable instructions, which may be run under control of operating system 241 to enable and manage requesting, receiving, and rendering markup pages such as WAP pages (sometimes referred to as WAP cards), SMGL, HTML, HDML, WML, WMLScript, JavaScript, and the like.

IM client 270 includes virtually any application configured to initiate and manage an instant messaging session, including, but not limited to AOL Instant Messenger, Yahoo! Messenger, .NET Messenger Server, ICQ, and the like. In one embodiment, IM client 270 is configured to employ a SIP/RTP client, such as SIP/RTP client 272 to integrate IM/VOIP features. As such, IM client 270 may also employ SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA (Open Mobile Alliance)'s IMPS (Instant Messaging and Presence Service) created specifically for mobile devices.

SIP/RTP client 272 is configured to enable client device 200 to initiate and manage a VOIP session with another client device. SIP/RTP client 272 is illustrated as employing the SIP protocol for managing signaling, and RTP for transmitting the VOIP traffic ("media"). However, the invention is not so constrained, and any of a variety of other VOIP protocols may be employed including IAX which carries both signaling and voice data, H.323, SCCP, Megaco, MGCP, MiNET, and the like. SIP/RTP client 272 is further configured to employ a variety of speech codecs to compress the media stream for communicating it over the network, including G.711, G.729, and the like.

IIC 274 is configured to integrate access to call information across various client applications, including browser client 246, IM client 270, and SIP/RTP client 272. IIC 274 may provide a user interface to enable access to the call information. In one embodiment, the user interface is accessible within browser client 246, IM client 270, and SIP/RTP client 272, through any of a menu selection, key entry, button selection, icon, and the like. Upon selection, IIC 274 provides a display, such as described below in conjunction with FIG. 3. The end-user may then employ the user interface to re-order the call information based on any of a variety of criteria, including time, source, keyword, a relationship, an event, and the like. The end-user may then select the call information for use. For example, the end-user may search for a presence of any voice mail messages that have been received within a prior period of time, and select at least one received voice mail to be played. IIC 274 may employ a process similar to that described below in conjunction with FIG. 4 to perform at some of its actions.

Figure 3:
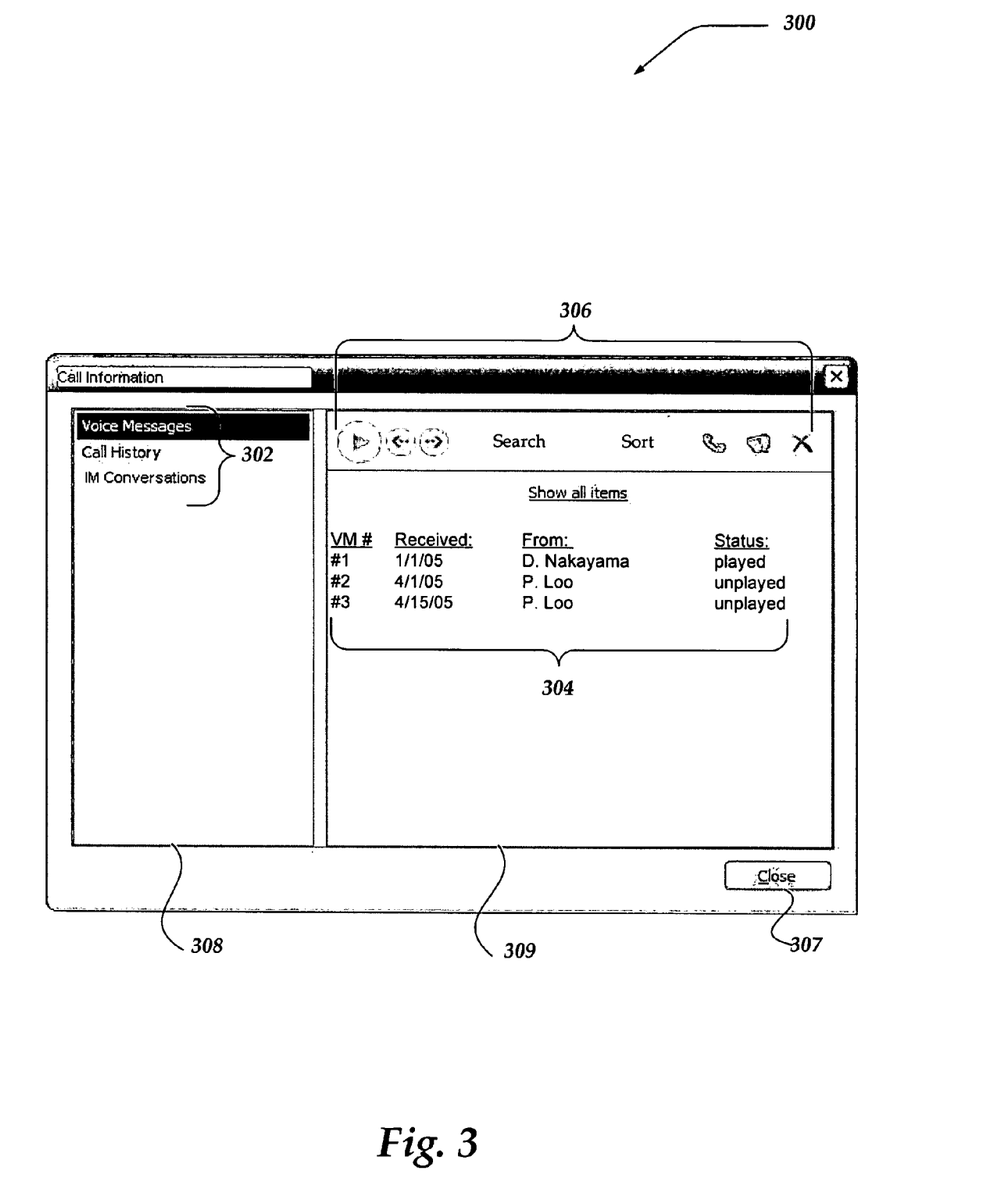
FIG. 3 shows one embodiment of an example screen display for use in integrating access to IM, call histories, and voice mail.

FIG. 3 shows one embodiment of a screen display for use in integrating access to call information on a client device. As such, display 300 enables an end-user to employ an integrated structure to display a plurality of call files from a variety of sources, including IM sessions, audio sessions, and the like. Moreover, display 300 enables the end-user to perform a variety of actions over the plurality of call files. Thus, for example, the end-user may perform a search, sort, and the like, across the displayed plurality of call files, including IM conversations, audio messages, and call histories in a single integrated approach.

Display 300 may be selected from within any of a variety of client applications, including an IM client, VOIP client, browser client, and the like. Selection may be accomplished through a key entry, an icon, a pen selection, and the like. Display 300 may be managed by an underlying application, such as IIC 274 of FIG. 2.

Not all of the components shown in FIG. 3 may be required to practice the invention, and variations in the arrangement and type of the components may be made without departing from the spirit or scope of the invention. However, as shown, display 300 includes left pane 308, right pane 309, and close icon 307. Left pane 308 includes call information 302, and right pane 309 is currently displaying voice message details 304, and selection icons 306.

Call information 302 shows an integrated structure for enabling access to voice messages, call history, and IM conversations, with voice messages currently selected. The underlying application, however, may be configured to enable selection of any one or combination of one or more of the call information entries. Thus, an end-user could select to display detail information for voice messages and call history, for example, or any other combination.

As shown, selection of voice messages may provide voice message details 304. Voice message details 304 may include more or less information that illustrated in FIG. 3. As shown however, voice message details 304 includes a count, a received date, a sender's name, and information regarding whether the voice mail message has been played, or is currently unplayed. Employing any one or more of selection icons 306 enables the end-user to sort, search, scroll, and the like, through voice message details 304. For example, the end-user may be enabled to sort voice message details 304 based on an ordinality of events, relationships, and the like. Selection icons 304 may also enable searching for a voice message (and/or other call information) based on a keyword entry, a message field, and the like. Selection icons 306 further enable the end-user to select a voice message, from voice message details 304 for deletion, forwarding, replying to, for listening to, and the like. Also shown is close icon 307 that enables display 300 to be closed, such that the end-user may be returned to another client application.

Selection to listen to a voice message may be forwarded by the underlying application either directly to a server application, such as described above in conjunction with FIG. 1, or through another client application to the server application.

As shown, display 300 includes at least two panes (308-309). However, the invention is not constrained to showing two panes simultaneously. Moreover, the invention may employ many more or less panes that two, without departing from the spirit of the invention. Thus, in one embodiment, a client device may be configured to display left pane 308, and upon selection of one or more categories with call information 302, the client device may then display right pane 309.

Generalized Operation

Figure 4:
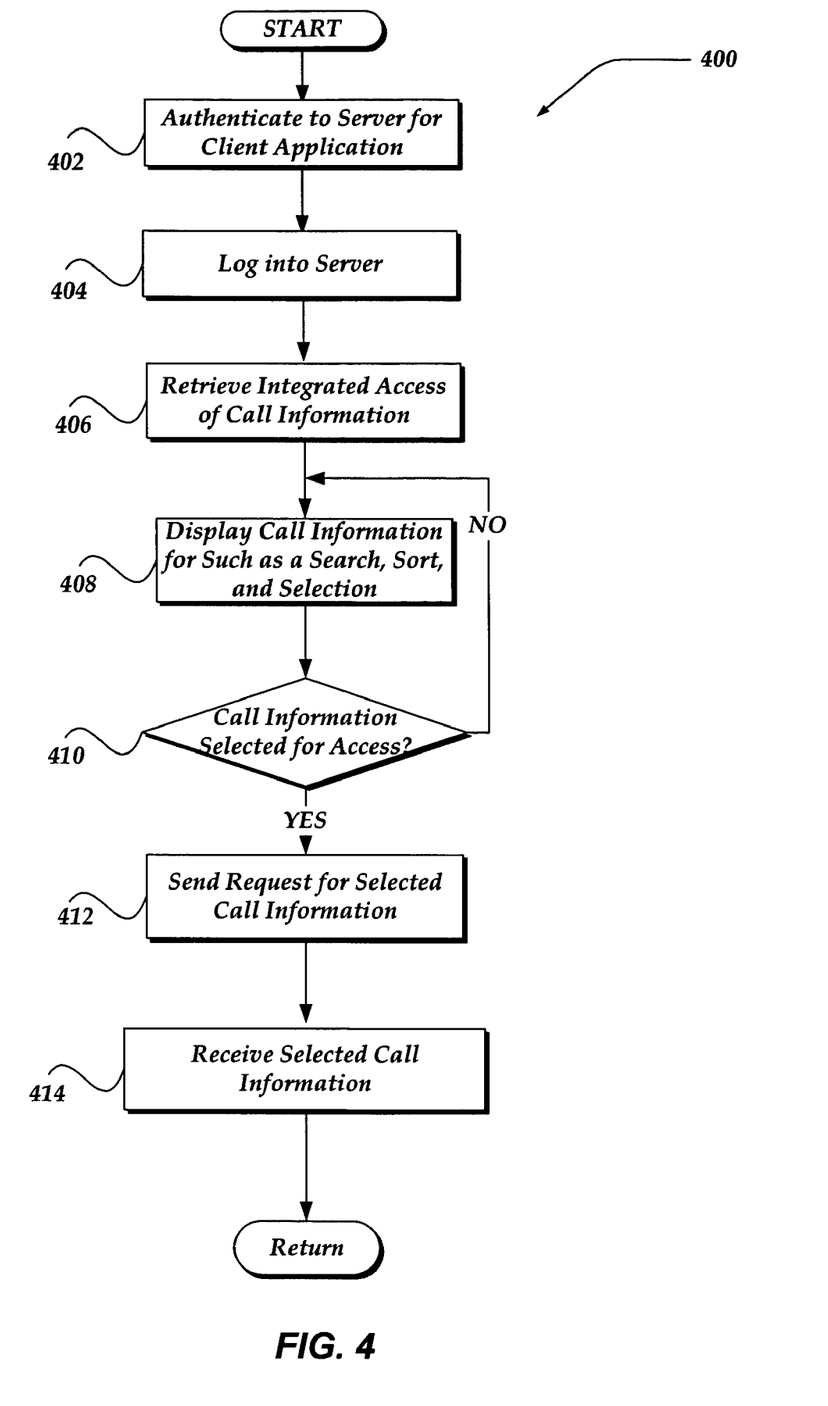
FIG. 4 illustrates a logical flow diagram generally showing one embodiment of a client process for integrating access to instant message conversations, call histories, and audio messages across various clients, including IM clients, VOIP clients, and/or Web-based clients.

The operation of certain aspects of the invention will now be described with respect to FIG. 4. FIG. 4 illustrates a logical flow diagram generally showing one embodiment of a client process for integrating access to instant message conversations, call histories, and voice mail across various client applications.

Process 400 of FIG. 4 begins, after a start block, at block 402, when a client application attempts to access an account and become authenticated. Access may be attempted using any of a variety of client and/or client devices. For example, an end-user may attempt to access an account using a VOIP phone, a web browser, an IM client, an IM client employing an underlying SIP interface, and the like. However, it should be clear that other clients may be employed, without departing from the scope of the invention.

In the present example, the end-user may enter a phone number (called a line identifier—CLI) to seek access to a known account. In one embodiment, the entered phone number is the same phone number as may be assigned to the VOIP phone. In another embodiment, the CLI is a number assigned to an access account. It should be clear, however, the CLI may represent something other than a phone number. For example, the CLI may also be a domain address, an IP address, or the like.

Upon receiving the CLI may be communicated to a server, such as SIP connection server 130 of FIG. 1, or the like. In addition, the client application may further send an originating line identifier (OLI) as part of the communication, in a separate communication, or the like. In one embodiment, the end-user may enter the OLI. It should also be clear, however, the OLI may represent something other than a phone number. For example, the OLI may also be a domain address, an IP address, or the like.

Upon receiving the CLI and OLI, the server may attempt to authenticate access. Authentication may be performed using any of a variety of mechanisms. In one embodiment, the CLI and OLI may be used for access control as well as for routing. For example, if the OLI is determined to be equal to the CLI, then the server may infer that the end-user is attempting to call him (or her) self. In that instance, the server may forward the end-user to their own voice mail box, or the like, such that they may listen to their own voice mail messages and/or manage them.

In addition, additional authentication may be implemented by requesting the end-user to provide a Personal Identification Number (PIN), a password, or the like. In any event, if authentication is denied an attempted connection to the server may be broken, denied, and the like. Process 400 may then be exited. If, however, the access request is determined to be authentic, processing continues to block 404 where the end-user is enabled to be logged into the server for access to call information.

Processing moves next to block 406, where the end-user may select to retrieve and view their call information. In one embodiment, the end-user may employ the intelligent integration client described above, to retrieve and view call information. Call information may be stored in any of a variety of locations, including on the client device. In any event, the intelligent integration client is enabled to provide requests for and retrieve the call information from the various locations.

Moreover, retrieved call information may be received using any of a variety of mechanisms. For example, the call information may be received as a background action, enabling the end-user to perform other actions while the call information is retrieved. In one embodiment, the call information is retrieved using an intelligent download mechanism whereby header information such as sender information, subject information and the like, associated with the call information items is downloaded rather than downloading the entire message of each call information item. The information may also be enabled to retrieve the call information in real-time, as requested, or even a combination of background and real-time.

Call information items that have not been reviewed by the end-user may employ a notification mechanism. For example, an icon may be displayed on the end-user's display screen indicating a presence of an un-reviewed call information item. Moreover, the icon may be specific to the type of call information not reviewed. For example, a tape recorder icon could be employed to indicate a voice message is retrieved that has not been reviewed, while another icon may be employed to indicate an un-reviewed IM conversation, or the like. Moreover, the invention is not so limited, and an audio indicator may also be employed to indicate un-reviewed call information items.

Process 400 continues next to block 408, where the retrieved call information is displayed to the end-user using a display mechanism that integrates access to the various call information categories, such as described above. At block 408, the end-user may scroll through the displayed call information, sort the call information, search for call information based on a variety of criteria, and so forth. Although not shown, at block 408, the end-user may also elect to close the display of the call information and exit process 400 at any time.

Processing flows to decision block 410 where a determination is made whether the end-user has selected particular call information for access, such as an IM conversation, voice mail, a call history file, and the like. If the end-user has not selected particular call information for access, processing loops back to block 408, where the end-user may continue to review the displayed call information or elect to exit process 400.

If, however, the end-user has selected particular call information for access, processing flows to block 412, where a request for the particular call information is sent. In one embodiment, selection of the particular call information item also may provide additional information including a sender name, alias, or the like, a picture, an originator line identifier, a log-in identifier, or the like.

In our example, the end-user may have elected to listen to a particular voice mail message. Processing then proceeds to block 414, where the client device receives the particular call information. Process 400 then returns to a calling process to perform other actions.

Figure 5:
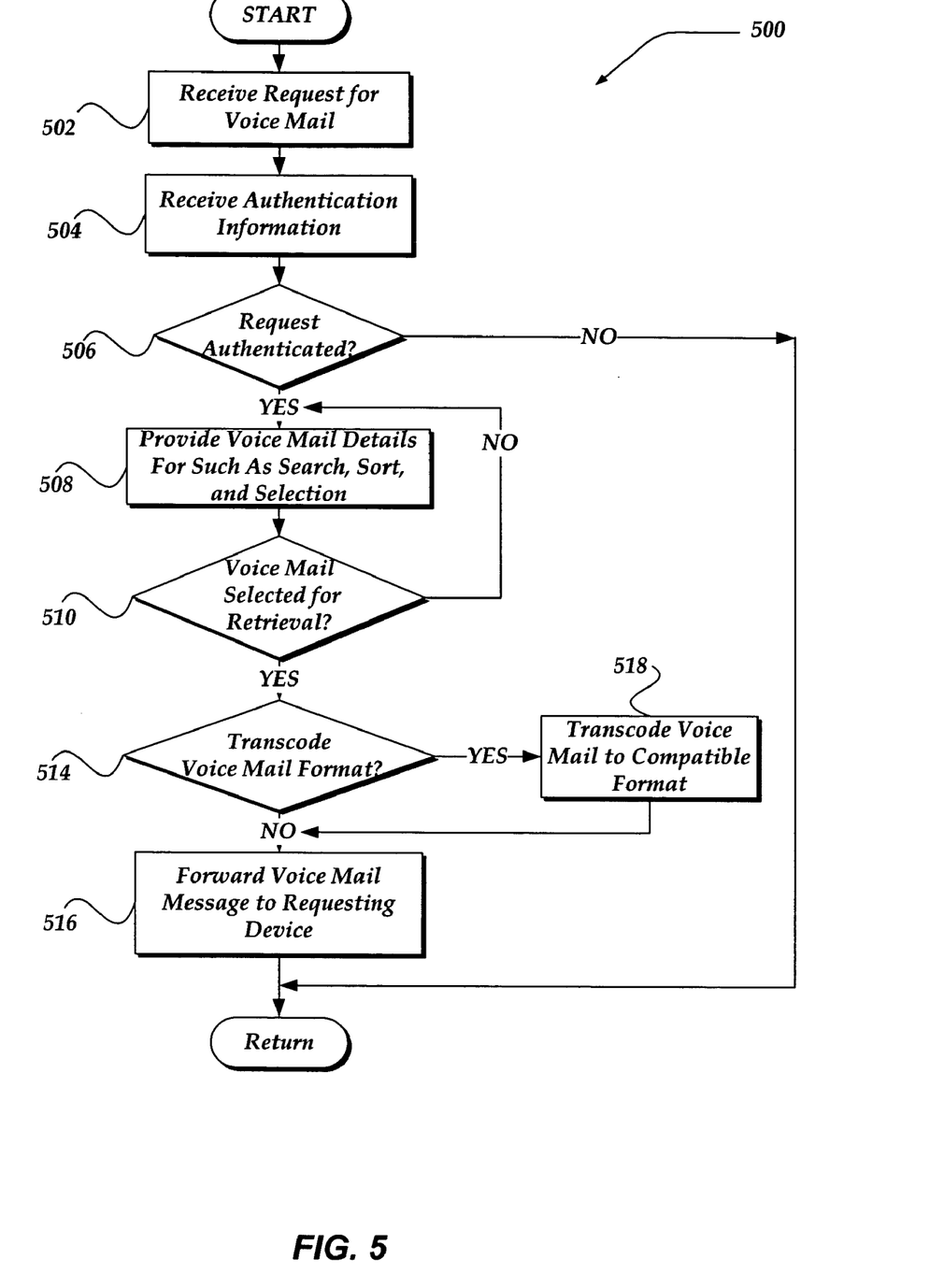
FIG. 5 illustrates a logical flow diagram generally showing one embodiment of a server process for integrating access to call information, such as a file, across various client applications.

FIG. 5 illustrates a logical flow diagram generally showing one embodiment of a server process for integrating access to call information, such as a voice mail file, across various client applications, in accordance with the present invention. Process 500 of FIG. 5 may be considered to be complementary actions performed by a server to those actions described above for process 400 of FIG. 4.

Thus, process 500 begins after a start block at block 502, where a request for a voice mail message is received. In one embodiment, information about the requesting client may also be provided with the request, or even subsequent to the request. Such information may, for example, include what protocols, and/or data formats are employable by the client application and client device. In one embodiment, such information may be obtained through a header sent by the requesting client.

Process 500 continues to block 504, where authentication information associated with the request is received. In one embodiment, the authentication information includes a PIN, password, and the like, along with an OLI, account identifier, and the like.

Processing continues to decision block 506, where a determination is made whether the request is authentic. Authentication may be based on any of a variety of criteria, including a wrong PIN, password, or the like for the provided OLI, account identifier, or the like. In any event, if the request is determined to be unauthentic, processing may exit to another calling process. Although not shown, in one embodiment, the process may also provide multiple attempts before exiting; provide an error message, or provide any of similar actions.

If, however, the request is determined to be authentic, processing flows to block 508 where voice mail details are provided to the end-user for use in searching, sorting, selecting, and/or deleting. Process 500 continues to decision block 510, next, where a determination is made whether the end-user has selected a particular voice mail message for retrieval. If the end-user has not selected a voice mail message for retrieval, processing loops back to block 508, to allow the end-user to continue reviewing their voice mail message details. Although not shown, the end-user may of course exit process 500 at anytime, including during block 508.

If, however, the end-user has selected a particular voice mail message for retrieval, processing continues to decision block 514, where the requested voice mail message is located and evaluated to determine whether it is in a format that is compatible with the requesting client. For example, the requesting client (application and device) may be employing a SIP/RTP protocol with a G.711 data compression format, or the like, and the voice mail message may be stored in another compression format, such as Speex, or the like. In another example, the requesting client could be configured to receive the Speex compression format.

In any event, if it is determined that the voice mail message needs to be transcoded, processing flow to block 518 where a codec is selected to convert the voice mail format to the compatible format for the requesting client application/device. Processing the flows to block 516. If no transcoding is required, processing also continues to block 516. At block 516, the requested voice mail message is forwarded to the requesting device. In one embodiment, the voice mail message is forwarded to a voice mail server that is configured to manage a predetermined communications protocol. Thus, for example, the requested voice mail message may be forwarded to a SIP voice mail server for delivery over SIP/RTP to the VOIP phone; or to a SIP/RTP client that may interface with an IM client or the like; or even to a SOAP voice mail server for delivery to an IM client; or the like. Thus, using the intelligent integration client, a variety of client applications and client devices may be enabled to seamlessly access call information.

Figure 6:
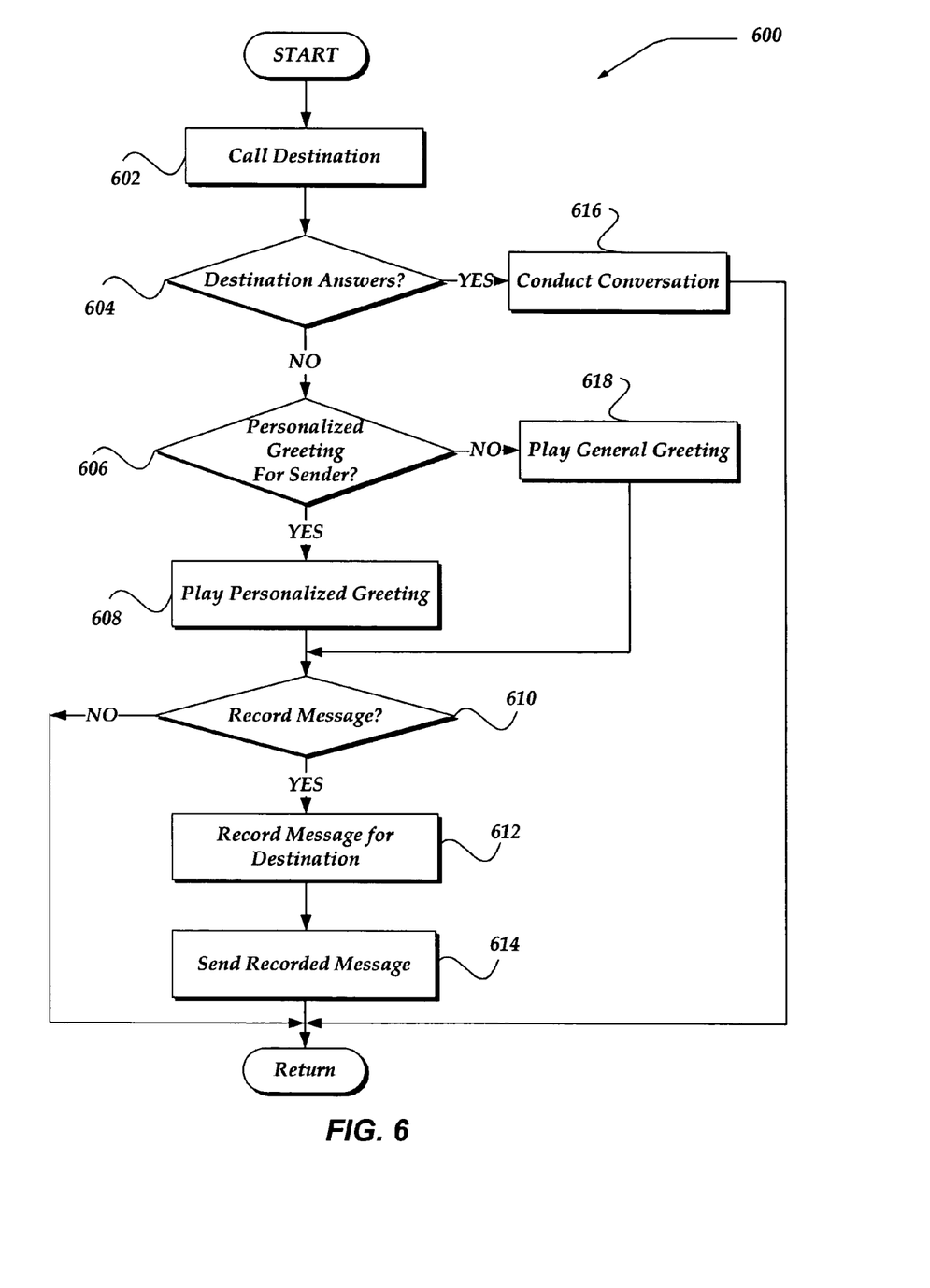
FIG. 6 illustrates a logical flow diagram generally showing one embodiment of a call process for receiving personalized greetings and sending a message.

FIG. 6 illustrates a logical flow diagram generally showing one embodiment of a call process for receiving personalized greetings and sending a message. Process 600 of FIG. 6 may be implemented within any of client devices 102-104 of FIG. 1. However, for illustrative purposes, assume in process 600 that client device 102 (as a sender) is attempting to converse with client device 103 (as a destination). However, the invention is not so limited, and virtually any client device may be the sender, or the destination, without departing from the scope or spirit of the invention.

Process 600 begins, after a start block, at block 602, where the sender attempts to contact the destination for a conversation. In one embodiment, the sender may attempt to contact the sender using VOIP, VOIP integrated with IM, or any of a variety of other mechanisms.

Processing flows next to decision block 604 where a determination is made whether the destination answers the request for a conversation. At this block, the destination may receive information indicating that a sender is attempting to contact them. In one embodiment, the sender may have sent various information as part of their attempt to contact the destination. Such information may include, for example, the sender's name, alias, a picture or other graphic, an OLI, a log-in identifier, or the like. In one embodiment, a server may be employed to enable the sender to send the various information.

Figure 7:
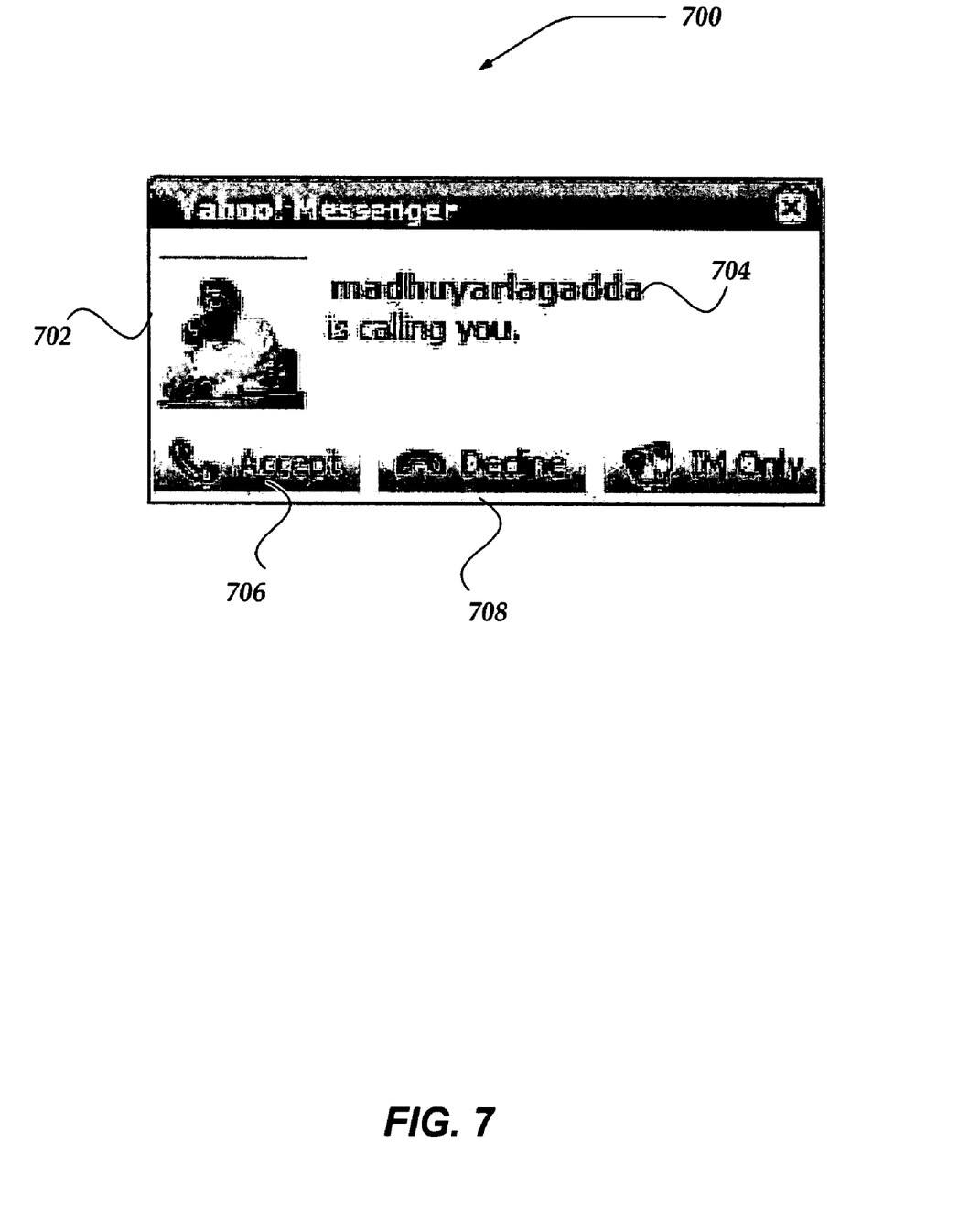
FIG. 7 illustrates one embodiment of an example of a screen display for use in notifying a destination of a call being attempted, in accordance with the present invention.

Referring briefly to FIG. 7, one embodiment of a possible screen display is shown that the destination might receive in response to the sender's attempt to contact them. As shown in FIG. 7, screen shot 700 includes picture 702, and name 704. Also shown in screen shot 700 are accept 706 and decline 708 options. It should be noted, that screen shot 700 may include more or less components then shown.

At decision block 604, the destination may select to accept the request for contact via accept 706 of FIG. 7, or similar action. Similarly, the destination may select to decline the request for contact via decline 708 of FIG. 7, or similar action. Moreover, if the destination is unavailable to make such selections, a server may be configured to default the selection to decline the request for contact. In any event, if the destination answers the request from the sender, processing flows to block 616, where the sender and destination may conduct a conversation using any of a variety of mechanisms, including voice, VOIP, voice integrated with IM, IM, or the like. Upon completion of block 616, the process returns to a calling process to perform other actions.

However, if at decision block 604, the destination declines to accept the request, processing moves to decision block 606. At decision block 606 a determination is made whether a personalized greeting is available for the sender. In one embodiment, the sender may wait for a predefined period of time prior to attempting to contact the server to determine whether a personalized greeting is available. As communications with between the sender and the server may include the sender providing an OLI, a caller identifier, login identifier, or the like, the server may readily be able to determine a presence of a personalized greeting for the sender. In any event, if the destination has provided a personalized greeting processing flows to block 608 where the personalized greeting is provided to the sender. Processing flows to decision block 610. If, however, at decision block 606 no personalized greeting is available for the sender, processing flows to block 618, where a general greeting may be provided to the sender. Processing then continues to decision block 610.

At decision block 610, a determination is made whether the sender is to provide a message to the destination. Such message may include a voice mail message, for example. If a message is to be provided to the destination, for later playback, processing to block 612; otherwise, processing returns to the calling process to perform other actions.

At block 612, the sender may then record the message to be stored for later playback by the destination. The process then continues to block 614, where the message may then be sent to the server for storage. In one embodiment, the message is sent to the server for storage as a background action of the sender's client device.

Moreover, at block 614, the server may perform an analysis of the received message. For example, the server may perform a spam check, virus check, or the like, on the message. In one embodiment, the server may perform, for example, a message spam check that enables only senders that are in the destination's buddy list, message accept list, or the like, to send a message for storage. In another embodiment, the server may restrict the sender from sending multiple messages within a predefined period of time, or a substantially similar message to multiple destinations, or the like. In any event, if the message is accepted for storage as a valid message to send to the destination, the server may also enable a notification to be sent to the destination. In one embodiment, the notification may be sent to the destination when the destination next logs in and seeks to access their call information. Upon completion of block 614, processing returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions. Moreover, at least some of the blocks of the flowchart illustration, and combinations of some of the blocks in the flowchart illustration, can also be implemented using a manual mechanism, without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing call information over a network, comprising:
   sending a request for call information from a first client application for a client device, the first client application is operative as one of a Voice Over IP (VOIP) telephone application based at least on a SIP protocol, a browser application, or a message application, wherein the call information comprises a plurality of call files from different sources and different types;
   receiving the requested call information;
   displaying the requested call information in an integrated structure on the client device, wherein displaying the requested call information in the integrated structure comprises displaying the plurality of call files from different sources within the requested call information in the integrated structure within the first client application with a first compatible audio file format on the client device;
   enabling a selection of at least one audio call file in the call information;
   determining if the at least one selected audio call file is in a file format incompatible with the first integrated client application associated with the request, and if the at least one audio call file is in an incompatible format, transcoding the at least one audio call file to the first compatible audio file format;
   forwarding the at least one transcoded audio call file to the client device for playback, and
   displaying the plurality of call files from different sources within the requested call information in the integrated structure within a second client application, wherein the second client application employs a second compatible audio file format.

2. The method of claim 1, wherein the call information further comprises at least one call file associated with at least one of an audio message, an IM conversation, and a call history.

3. The method of claim 1, wherein displaying the plurality of call files from different sources within the requested call information in the integrated structure within the first client application and the second client application further comprises displaying voice mail messages, IM messages, call history, call logs, and billing information.

4. The method of claim 1, further comprising:
a sender of at least one item in the call information, receiving a personalized greeting.

5. The method of claim 1, where the display is integrated into an Instant Messaging client.

6. The method of claim 1, wherein the plurality of call files further comprise at least one audio message call file, and at least one IM conversation.

7. The method of claim 1, wherein receiving the request further comprises: receiving information associated with the client device indicating a file format that is compatible with the first client application.

8. The method of claim 1, wherein displaying the requested call information further comprises displaying the call information in a time ordered list.

9. The method of claim 1, wherein enabling the selection of at least one call file further comprises performing at least one of a search, a sort, a delete, and a select on the call information.

10. The method of claim 1, further comprising:
receiving an identifier associated with the client device; and
employing the identifier to authenticate the request for the call information.

11. The method of claim 10, wherein employing the identifier further comprises authenticating that the identifier is associated with an account.

12. The method of claim 10, wherein the identifier is a Personal Identification Number (PIN).

13. The method of claim 1, further comprising:
receiving from the client device a called line identifier (CLI) and an originating line identifier (OLI); and
if the CLI substantially equals the OLI, enabling access to the requested call information.

14. The method of claim 1, wherein the first client application is at least one of an Instant Messaging (IM) client, a VOIP client, a SIP/RTP client, and a web browser client.

15. A server for use in managing call information over a network, comprising:
a transceiver for receiving and sending information to another computing device;
a processor in communication with the transceiver; and
a memory in communication with the processor and for use in storing data and machine instructions that causes the processor to perform a plurality of operations, including:
receiving a request for call information from a first client application for a client device, the first client application is operative as one of a Voice Over IP (VOIP) telephone application based at least on a SIP protocol, a browser application, or a message application, wherein the call information comprises a plurality of call files that includes at least one of an IM file, an audio file, and a call history;
retrieving the requested call information;
sending the requested call information to the client device, wherein the client device is enabled to display the plurality of call files within the requested call information in an integrated structure within the first client application with a first compatible audio file format on the client device, and wherein the plurality of call files within the requested call information in the integrated structure is enabled to be displayed within a second client application with a second compatible audio file format;
receiving a request for at least one call file in the call information;
if the at least one call file is in an incompatible audio format to the first client application associated with the request, transcoding the at least one call file to the first compatible audio file format;
forwarding the at least one transcoded audio call file to the client device for playback.

16. The server of claim 15, wherein the call information further comprises at least one call file associated with at least one of an audio message, an IM conversation, and a call history.

17. The server of claim 15, wherein receiving the request further comprises: receiving information associated with the client device indicating an audio file format that is compatible with the first client application.

18. The server of claim 15, wherein displaying the requested call information further comprises displaying the call information in a time ordered list.

19. The server of claim 15, wherein enabling the display of the requested call information further comprises performing at least one of a search, a sort, a delete, and a selection of at least a portion of the call information.

20. A computer readable non-transitory storage medium for managing call information over a network by enabling actions, the computer readable non-transitory storage medium comprising instructions stored thereon that, when executed by a computing device, enable the computing device to perform the actions, including:
sending, to a server, a request for call information from a first client application for a client device, wherein the call information comprises a plurality of different varieties of call files;
sending, to the first client application for the client device, the requested call information, the first client application is operative as one of a Voice Over IP (VOIP) telephone application based on a SIP protocol, a browser application, or a message application;
displaying, within the first client application at the client device, the different varieties of plurality of call files within the requested call information to enable integrated access to the requested call information, wherein the first client application is compatible with a first audio file format;
enabling a selection of at least one audio call file in the call information;
if the selected at least one audio call file is in a file format incompatible with the first client application associated with the request, transcoding the at least one audio call file to the compatible first audio file format;
forwarding the at least one transcoded audio call file to the client device for playback; and
displaying, within a second client application, the different varieties of the plurality of call files within the requested call information to enable integrated access to the requested call information within the second client application, wherein the second client application is compatible with a second audio file format.

21. The computer readable non-transitory storage medium of claim 20, wherein the call information further comprises at least one call file associated with at least one of an audio message, an IM conversation, and a call history.

22. The computer readable non-transitory storage medium of claim 21, wherein the audio message further comprises a voice mail message.

23. The computer readable non-transitory storage medium of claim 20, wherein the first client application further comprises at least one of an IM client, a VOIP client, and a web browser client.

24. In a computer device having a graphical user interface and a user selection interface mechanism, a method of managing call information, comprising the steps of:

providing a request for access to call information, wherein the call information comprises a plurality of call files including at least two of a voice mail message, an IM conversation, and a call history;

displaying the plurality of call files in an integrated display structure that enables at least one of an integrated sort, and an integrated search of the plurality of call files, wherein displaying the plurality of call files in the integrated display structure comprises displaying the at least two of the plurality of call files in the integrated display structure within a first client application compatible with a first audio file format on the computer device, and wherein the at least two of the plurality of call files in the integrated display structure is enabled to be displayed within a second client application compatible with a second audio file format, the first client application is operative as one of a Voice Over IP (VOIP) telephone application based at least on a SIP protocol, a browser application, or a message application;

enabling a selection of at least one audio call file in the plurality of call files;

receiving the at least one selected audio call file, wherein if the selected at least one audio call file is in a file format incompatible with the first client application associated with the computer device, receiving the at least one selected audio call file transcoded to the compatible first audio file format for playback.

25. The computer device of claim 24, wherein the computer device is a mobile device.

26. The computer device of claim 24, wherein displaying the plurality of call files is enabled employing an intelligent integration client residing on the computer device.

* * * * *